Nov. 22, 1927.
J. SCHLAGENHAUF
1,649,980
AUTOMATIC TRAILER COUPLING
Filed Dec. 10, 1926
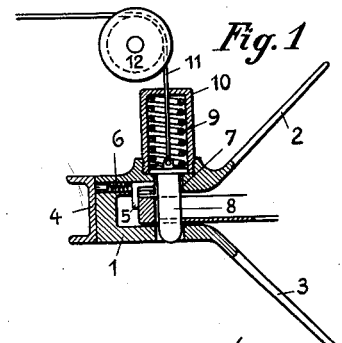
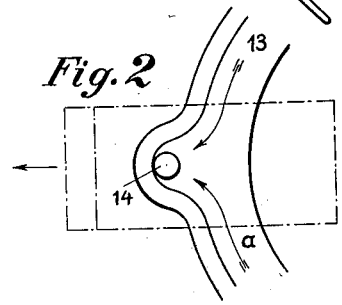
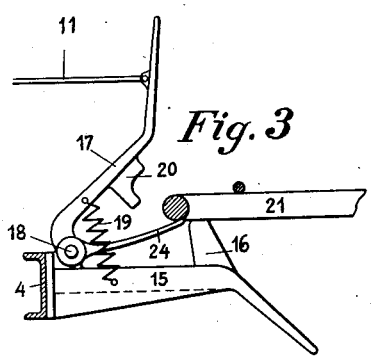
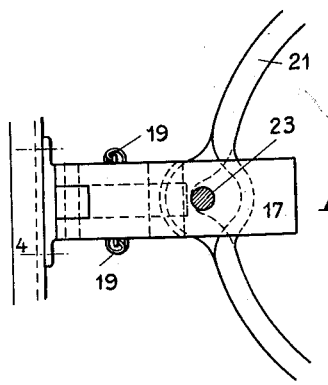
Inventor,
Johann Schlagenhauf
By Henry Orth Jr.
atty Patented Nov. 22, 1927.

1,649,980

UNITED STATES PATENT OFFICE.

JOHANN SCHLAGENHAUF, OF OERLIKON, NEAR ZURICH, SWITZERLAND.

AUTOMATIC TRAILER COUPLING.

Application filed December 10, 1926, Serial No. 153,914, and in Germany December 12, 1925.

The object of the following invention is an automatic trailer coupling with spring coupling bolts and a semicircular coupling shaft. It is characterized by the fact that the coupling bail is provided with a closed eye for the coupling bolt.

The drawing shows the invention in two executory examples. Fig. 1 shows the coupling secured to the motor-car and in longitudinal section in coupling position; Fig. 2 is a plan view of the coupling bail on the trailer; Fig. 3 is a longitudinal section of a modification of the coupling bail about to be uncoupled; Fig. 4 is a plan view of the coupling.

The part of the coupling fixed to the motor-car in the first example consists of the coupling head (1) with its two arms (2) and (3) upwardly and downwardly directed, respectively at an angle to each other. This device is attached behind the motor-car on the U-iron (4), e. g. screwed on. In the upper arm (2) there is a bolt (5) under the influence of the spring (6) which in uncoupled position closes the opening (7) for the passage of the coupling bolt (8) and holds it in retracted position. The latter is actuated by the helical spring (9) which is placed to the case (10) screwed in the coupling head. From the coupling bolt (8) a traction member, in the example, a cord (11) passes over a guide-roller (12) to the driver's seat. The coupling bail (13) is of angular transverse section, has a coupling-eye (14) and is on the trailer. This bail is so mounted on the trailer that its foremost free extremity with the eye stands approximately at the level of the middle between the angle of the arms 2 and 3.

If, when the trailer is to be coupled to the motor-car, the latter is moved backwards against the bail, the arms (2) and (3) guide the bail into the coupling head. The bolt 5 is thus thrust away from the opening (7) and the coupling bolt is pressed by the spring (9) on to the flange (a) of the bail, thus connecting the trailer automatically to the car. With the subsequent pulling of the motor-car the coupling bolt (3) on the flange $a$ slides in the direction of the arrow (Fig. 2) toward the more sharply curved portion of the bail containing the coupling-eye (14) and as soon as it has reached this position it penetrates the same. The springs (6) and (9) with the bolt (5) serve as security against unintentional uncoupling of the trailer. When the trailer has to be uncoupled the pull member (11) is drawn from the driver's seat, whereby the bolt (8) is drawn up and liberates the bail (13).

In the second executory example (Fig. 3) the coupler attached to the U-iron of the motor-car is formed of an arm (15) having a nose (16) and a bolt (17). The latter is jointed to arm (15) at (18) and is actuated by the spring (19) in such a way that in the coupling position the bolt (17) is pressed on to the nose (16), whereby the arm (24) and the noses (20) and (16) hold the bail (21) immovable. The bolt (17) is provided with a traction member in the example, with a cord (11), which is conveyed to the driver's seat. The transverse section of the bail in this form of execution is circular in shape and the coupling-eye (23) is so constructed that the bail (21) can lie without difficulty over the nose (16).

Without altering the character or operation of the coupling the coupling parts can be mounted either on the trailer or on the motor vehicle, in other words, the bail may be on the latter and the coupling head on the former.

I claim:

1. In a trailer coupling the combination with a coupling head and a coupling pin associated therewith; of a trailer bail having a closed eye for engagement by said pin.

2. In a trailer coupling the combination with a coupling head and a coupling pin associated therewith; of a trailer bail having a central more sharply curved portion containing a closed eye for engagement by said pin.

3. In a trailer coupling, the combination with a coupling head and a coupling pin associated therewith; of a trailer coupling bail having an angular cross section one flange being substantially vertical and the other substantially horizontal, directed toward the inside of the bail and provided with an eye, said horizontal flange supporting the pin in provisional coupling position, and both flanges automatically directing the pin to said eye upon a direct pull by the head.

4. In a trailer coupling, the combination with a coupling head and a coupling pin associated therewith; of a coupling bail having an upwardly directed flange and an inwardly directed flange provided with an eye situated in a more sharply curved forwardly directed middle portion of the bail into which the coupling pin is automatically directed when traction is applied to the head.

In testimony that I claim the foregoing as my invention, I have signed my name.

JOHANN SCHLAGENHAUF.